(12) United States Patent
Fukushima

(10) Patent No.: US 7,159,787 B2
(45) Date of Patent: Jan. 9, 2007

(54) METHOD AND APPARATUS FOR RECORDING DATA

(75) Inventor: Itaru Fukushima, Fuchu (JP)

(73) Assignee: Eastman Kodak Company, Rochester, NY (US)

( * ) Notice: Subject to any disclaimer, the term of this patent is extended or adjusted under 35 U.S.C. 154(b) by 941 days.

(21) Appl. No.: 10/145,653

(22) Filed: May 15, 2002

(65) Prior Publication Data

US 2002/0191953 A1    Dec. 19, 2002

(30) Foreign Application Priority Data

May 16, 2001    (JP) .............................. 2001-184085

(51) Int. Cl.
    *G06K 19/06*    (2006.01)
(52) U.S. Cl. ...................... 235/494; 235/487; 382/165
(58) Field of Classification Search ................ 235/494, 235/454, 487, 469; 382/165, 166
    See application file for complete search history.

(56) References Cited

U.S. PATENT DOCUMENTS

| | | | |
|---|---|---|---|
| 4,399,209 A | 8/1983 | Sanders et al. | |
| 4,416,966 A | 11/1983 | Sanders et al. | |
| 4,440,846 A | 4/1984 | Sanders et al. | |
| 4,766,050 A | 8/1988 | Jerry | |
| 5,369,261 A | 11/1994 | Shamir | |
| 5,426,289 A | 6/1995 | Kinoshita et al. | |
| 5,500,661 A * | 3/1996 | Matsubara et al. | ........... 347/41 |
| 5,568,555 A | 10/1996 | Shamir | |
| 5,576,528 A | 11/1996 | Chew et al. | |
| 5,783,353 A | 7/1998 | Camillus et al. | |
| 5,818,032 A | 10/1998 | Sun et al. | |
| 5,869,828 A | 2/1999 | Braginsky | |
| 5,897,669 A | 4/1999 | Matsui | |
| 5,971,283 A | 10/1999 | Sawaguchi | |
| 6,141,441 A * | 10/2000 | Cass et al. | ................... 382/166 |
| 6,357,658 B1 * | 3/2002 | Garczynski et al. | ... 235/462.01 |
| 6,543,697 B1 * | 4/2003 | Imade et al. | ................. 235/494 |
| 6,681,055 B1 * | 1/2004 | Sato | ........................... 382/275 |
| 6,747,757 B1 * | 6/2004 | Enomoto | .................... 358/1.9 |
| 6,830,197 B1 * | 12/2004 | Rubin et al. | ................. 235/494 |
| 7,072,084 B1 * | 7/2006 | Shirasawa | ................... 358/525 |
| 2002/0145743 A1 * | 10/2002 | Lopez et al. | ................. 358/1.4 |
| 2004/0190019 A1 * | 9/2004 | Li et al. | ...................... 358/1.9 |

* cited by examiner

*Primary Examiner*—Jared J. Fureman
*Assistant Examiner*—Edwyn Labaze
(74) *Attorney, Agent, or Firm*—Nelson Adrian Blish

(57) ABSTRACT

A method for storing data including the steps of providing a sheet of media and printing a raw data pixel on the sheet of media, the raw data pixel being printed at a density and a color such that the raw data pixel represents a data point. The method further includes printing an associated compensated data pixel on the sheet of media, the compensated data pixel being printed at a density and a color, wherein the density and color of the compensated data pixel are related to the density and color of the associated raw data pixel by a predefined relationship. The method also includes the step of repeating the first and second printing steps until the desired data is stored on the sheet of media.

20 Claims, 5 Drawing Sheets

| NORMAL DATA PIXEL | COMPENSATED DATA PIXEL |
|---|---|
| CLASSIFICATION-1 | CLASSIFICATION-3 |
| CLASSIFICATION-2 | CLASSIFICATION-4 |
| CLASSIFICATION-3 | CLASSIFICATION-1 |
| CLASSIFICATION-4 | CLASSIFICATION-2 |

*FIG. 6*

| NORMAL DATA PIXEL | COMPENSATED DATA PIXEL |
|---|---|
| CLASSIFICATION-1 | CLASSIFICATION-4 |
| CLASSIFICATION-2 | CLASSIFICATION-3 |
| CLASSIFICATION-3 | CLASSIFICATION-2 |
| CLASSIFICATION-4 | CLASSIFICATION-1 |

*FIG. 7*

METHOD AND APPARATUS FOR RECORDING DATA

This application claims priority to Japanese Patent Application No. 2001-184085, filed May 16, 2001.

BACKGROUND OF THE INVENTION

Media storage devices, and more particularly, read-only media storage devices, such as CDs, DVDs, magnetic tapes and computer diskettes are widely used to store various data. The data stored on such devices can be nearly any machine readable data, including text, movies, books, pictures, computer code and software, bar codes, sounds (including music), recording applications including those using compressed data, and the like. However, the data storage capacity and/or data storage density of conventional media storage devices may be limited. Accordingly, there is a need for an improved method and apparatus for recording data.

SUMMARY OF THE INVENTION

The present invention is a method and apparatus for recording data. In one embodiment, the method and apparatus records various colors at various discreet densities to represent the data. In particular, in one embodiment, the invention is a method for storing data including the steps of providing a sheet of media and printing a raw data pixel on the sheet of media, the raw data pixel being printed at a density and a color such that the raw data pixel represents a data point. The method further includes printing an associated compensated data pixel on the sheet of media, the compensated data pixel being printed at a density and a color, wherein the density and color of the compensated data pixel are related to the density and color of the associated raw data pixel by a predefined relationship. The method also includes the step of repeating the first and second printing steps until the desired data is stored on the sheet of media.

Other objects and advantages will be apparent from the following description and the appended claims.

BRIEF DESCRIPTION OF THE DRAWINGS

FIG. 6 is a chart illustrating one classification scheme for data compensation;

FIG. 7 is a chart illustrating another classification scheme for data compensation.

DETAILED DESCRIPTION

Figure 1:
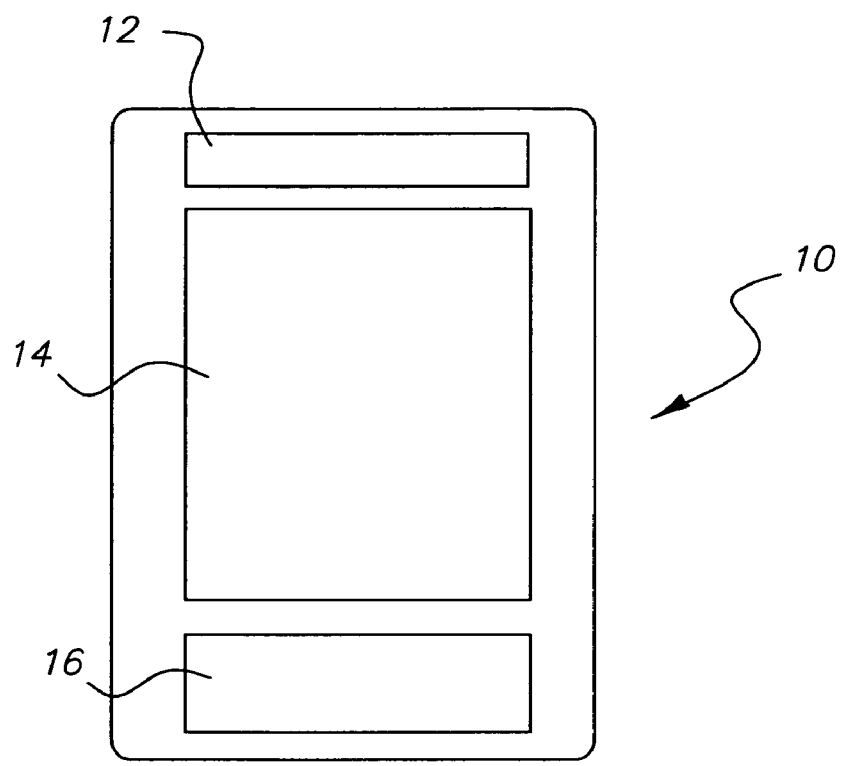
FIG. 1 is a front view of a media card upon which data may be recorded.

FIG. 1 illustrates a color code media card 10 which may be used in one embodiment of the present invention. The illustrated media card 10 includes an upper region 12 upon which a title or name of the media card 10 may be printed such that a user can read and ascertain the nature of the media card 10. The media card 10 may include a central region 14 upon which other indicia may be printed. For example, in one embodiment, a drawing, picture or photograph may be printed in the central region 14, and the title or label of such drawing, picture or photograph is printed in the upper region 12. The card 10 may also include a data storage region 16 upon which stored data is located or printed. The data stored or printed in the data storage region 16 preferably corresponds to the indicia printed in the central region 14 and upper region 12. However, it should be understood that the media card 10 need not necessarily include the upper region 12 and/or the central region 14, and may instead include only the data storage region 16.

Figure 3:
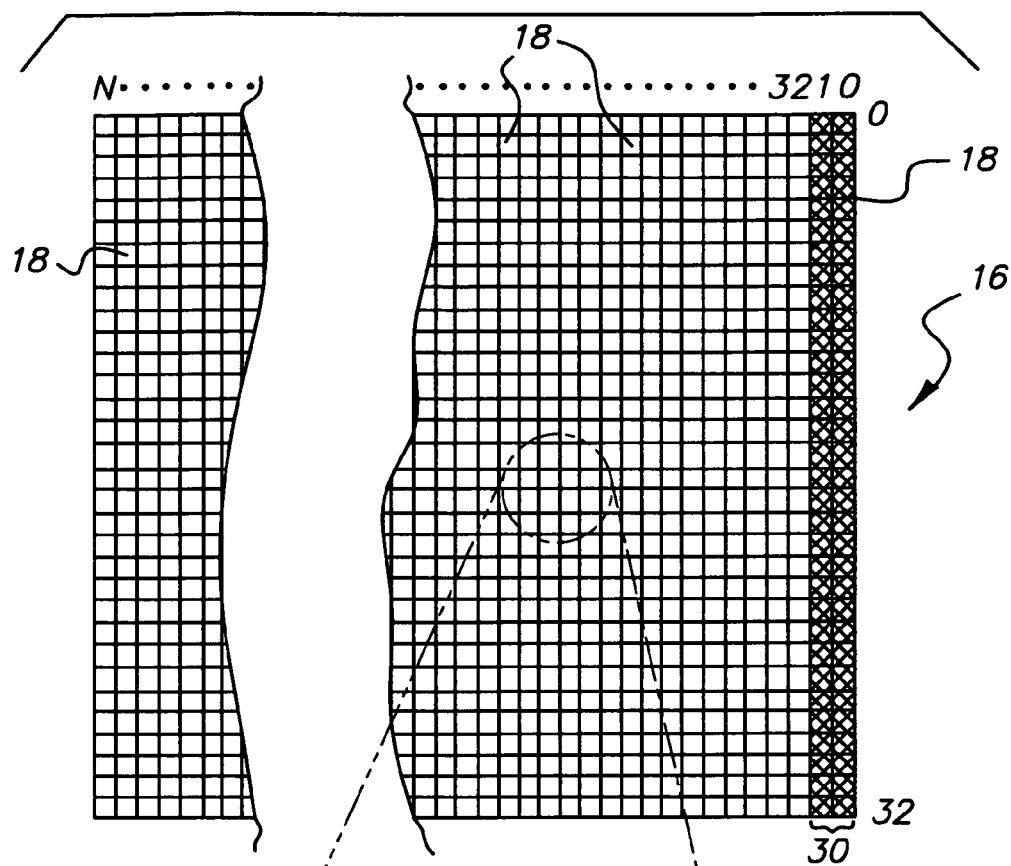
FIG. 3 is a detailed view of the data storage region of the media card of FIG. 1.
Figure 3A:
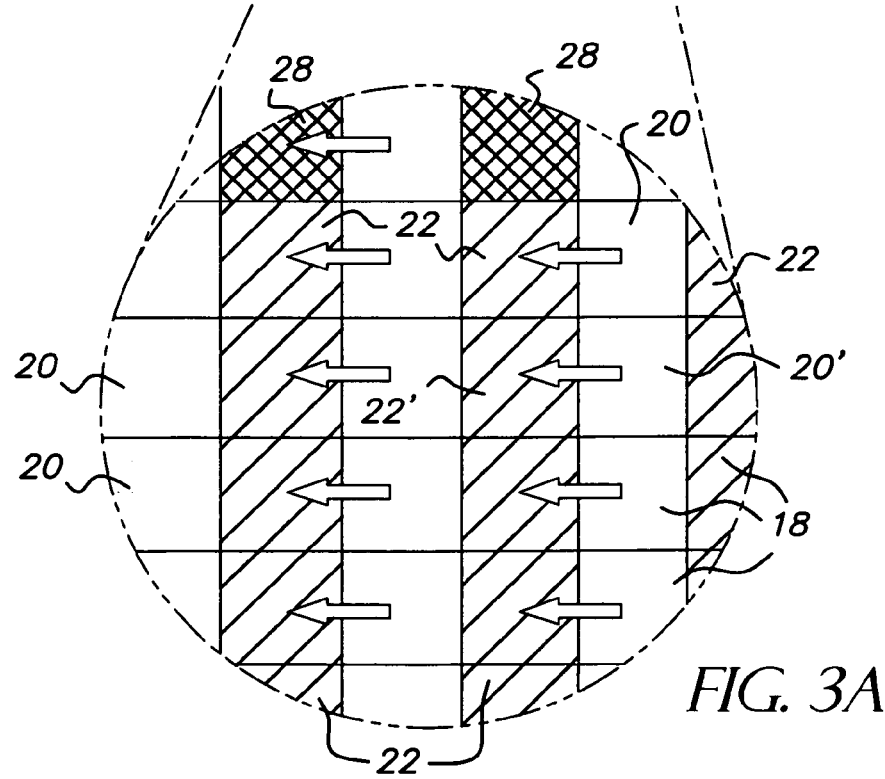

As shown in FIG. 3, the data storage region 16 may include a plurality of data pixels 18 arranged in a grid. The majority of the data pixels 18 are preferably either normal (i.e. raw) data pixels 20 or compensated (i.e. adjusted or redundant) data pixels 22. As shown in the enlarged portion of FIG. 3, in the illustrated embodiment, each compensated data pixel 22 is located immediately to the left of an associated normal data pixel 20, although the spacing relationship between the normal 20 and associated compensated 22 data pixels may be varied as desired. Each of the normal 20 and compensated 22 data pixels may include a plurality of different colors printed thereon in a fully overlapping manner, with each color being printed at one of a plurality of predetermined intensities or relative color densities. However, each normal 20 and compensated 22 data pixel may include only a single color printed thereon, or may include only various shades of a single color printed thereon.

Thus, each normal 20 and compensated 22 data pixel may have a single color to the eye, but be made of, for example, 3 primary colors, each primary color being printed at a specific relative density. In one embodiment, each of the normal data pixels 20 and compensated data pixels 22 may include up to three colors (i.e., cyan, magenta and yellow, or red, green and blue) printed thereon, with each of the colors being printed on the media card 10 in one of four discrete relative densities (i.e., 0%, 33%, 66% and 100%). Of course, a variety of other colors, differing number of colors and differing number of discrete densities (i.e. from 2 to 10 or more) may be used without departing from the scope of the invention. Thus, in the illustrated embodiment, each normal 20 or compensated 22 data pixel may include up to three colors printed thereon in an overlapping manner, with each color being printed at one of four different densities.

Figures 4, 5:
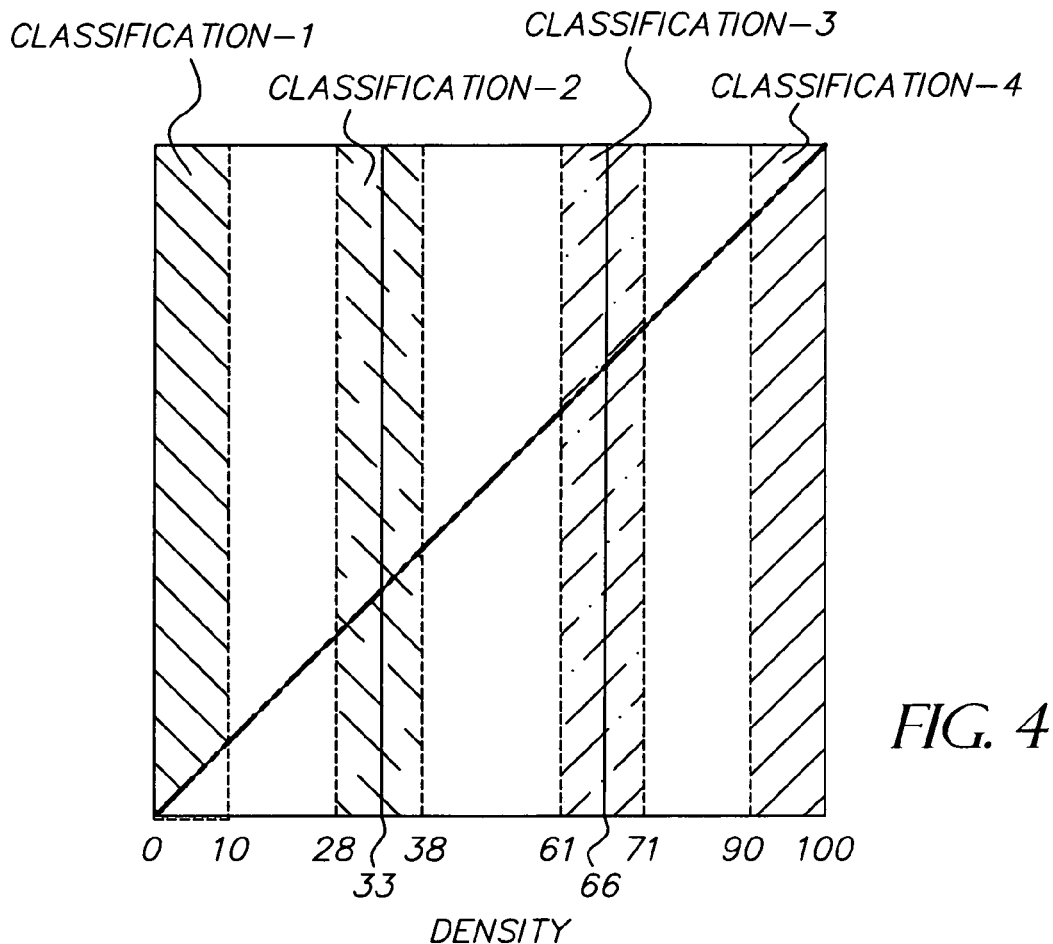
FIG. 4 is a graph illustrating one relationship between the density of a color and the classification of such density.
FIG. 5 is a chart illustrating one system for matching numbers with data read from a media card.

The differing densities and colors of the normal 20 and compensated 22 data pixel correspond to data characteristics represented by such pixel. For example, FIG. 4 illustrates a graph which represents one scheme for ascertaining or determining a data characteristic of a measured normal 20 or compensated 22 data pixel, for a given color, based upon the relative density of that color. As shown in FIG. 4, if the relative density of a color of a pixel is from 0% to 10%, the density is classified as "Classification 1." If the density is from 28% to 38%, the density data is classified as "Classification 2." and so on. In other words, density classification 1 is preferably 0% and includes densities ranging from 0% to 10%; density classification 2 is preferably 33%, and includes densities ranging from about 28% to 38%; density classification 3 is preferably about 65%, and includes densities ranging from about 61% to 71%; and density classification 4 is preferably about 100% and includes densities ranging from about 90% to 100%. Of course, as noted above, the classifications of density can be broken down in nearly any desired manner.

In order to read the data from the data storage region 14 of the media card 10, a piece of optical reading equipment, such as a color optical scanner, densitometer, calorimeter, spectrophotometer or the like, scans and reads each of the data pixels 18 on the data storage region 14 of the card 16. At each pixel location 18, the colors and density of each color printed thereon is determined. As shown in the enlarged portion of FIG. 3, the data storage region 16 may include a plurality of timing marks 28 located throughout the data storage region 16 at known, regular locations. The timing marks 28 may be printed as black) with a density of about 100% (or any other predetermined color/density pattern. The timing marks 28 may be regularly spaced throughout the data storage region 16 and be located at, for example, every four columns and four rows of the data pixel grid. In this manner, the optical scanner can use the timing marks 28 to track its location on the data storage region 16.

Once the optical scanner has scanned the data pixel or pixels 18 of the data storage region 16 and determined the density of each of the possible colors printed thereon, a processor, controller, CPU, computer or the like receives the raw data and processes the raw data to convert the raw data into decimal or binary numbers based upon a predetermined table or algorithm. The controller may be part of the optical scanner, or may be separate or part of a separate component that is coupled to the optical scanner. FIG. 5 illustrates a chart for converting the various combinations of colors and densities that may be found on a normal 20 or compensated 22 data pixel of the illustrated embodiment into a decimal or binary number. For example, if the optical scanner reads red, green and blue colors each having the lowest density (classification 1), then the controller may assign this combination a decimal number of 0. Continuing the example, as shown in FIG. 5, the controller may assign a combination of R4, G4, B4 (i.e., red, green and blue, each of the highest density), a decimal number of 63. Of course, a wide variety of relationships between the color/density characteristics and output data may be used. Thus, in order to properly read and unscramble the raw data, the controller must be supplied with a chart or algorithm which determines the relationship between the measured colors/densities and the output data, such as decimal or binary numbers, letters, text, characters, and the like.

Thus, it can be seen that a single data point or pixel 18 can represent the number of combinations equal to (the number of classifications of density) raised to the power of (the number of colors utilized). For example, in the illustrated embodiment four densities and three colors are used such that each data point or pixel 18 can represent a number anywhere from 0 to 63 (that is, $4^3$ or 64 data combinations).

As noted above, each normal data pixel 20 may include an associated compensated data pixel 22. The normal data pixel 20 and associated compensated data pixel 22 cooperate to provide redundancy of data and reduce the number of errors associated with reading the media card 10, for example, due to cross talk. In particular, each compensated data pixel 22 is related to the associated normal data pixel 20 by a predetermined relationship, such as the relationship illustrated in the chart of FIG. 6. As shown in FIG. 6, if the normal data pixel is printed with a density classification of 1, the compensated data pixel is printed with a density classification of 3. If the normal data pixel includes a density classification of 2, the compensated data pixel includes a density classification of 4, and so on as illustrated in FIG. 6. FIG. 7 illustrates another table illustrating an alternate relationship between the normal data pixels 20 and their associated compensated data pixels 22.

In general, if the relative density of a raw data pixel 20 is greater than about 50%, then the density of the associated compensated data pixel 22 is preferably less than about 50%. Conversely, if the density of a raw data pixel 20 is less than about 50%, then the density of the associated compensated data pixel 22 is preferably greater than about 50%. The color of each normal data pixel and the associated compensated data pixel preferably remains the same for both the normal and compensated data pixels, although the colors may be varied according in a predetermined manner if desired. For example, as shown in the enlarged portion of FIG. 3, using the data compensation scheme of FIG. 6 a raw data pixel 20' which is R3, G4, B2 is "converted" to a compensated data pixel 22' of R1, G2, B4.

In this manner, when the optical scanner reads the data storage region 16 of the media card 10, the optical scanner can check whether the read or measured characteristics of the normal data pixel 20 matches with the read or measured characteristics of the compensated data pixel 22 according to the predefined relationship. If the controller determines that the normal data pixel 20 and compensated data pixel 22 do not properly match, the controller may then determine that one of the normal 20 or compensated 22 pixels has been incorrectly printed and/or read, and the processor may then proceed to institute various data correction measures (i.e., removing the problematic data pixel, determining the data pixel value based upon surrounding data pixels and other indications, etc.).

Because lower density classifications are lighter, it is more likely that the optical scanner may improperly read the lower density classifications (i.e., density classifications 1 and 2) of a data pixel 18. Thus, the compensation scheme illustrated in FIG. 6 ensures that the lighter densities (classifications 1 and 2) are compensated into a darker, and more easily readable, density classification (classifications 3 and 4, respectively). Thus, if the normal data pixel 20 and compensated data pixel 22 do not properly match, one method for accommodating such a condition may be to consider that the data pixel (either normal or compensated) with the higher density classification represents the correct data pixel.

As shown in FIG. 3, the data storage region 16 may also or alternately include a calibration section 30 which may include colors and densities printed thereon in a known, predetermined manner. In this manner, the optical scanner can read and/or scan the calibration section 30 in order to calibrate the optical scanner to the specific nature of the colors printed on that media card 10. In the illustrated example, the calibration section 30 includes all possible 64 pixels printed thereon so that the optical scanner can read and calibrate each of the possible data pixels. For example, when the card 10 is printed with a darker density than expected, density classification 1 may be erroneously printed at 30%, density classification 2 may be erroneously printed as 60%; density classification 3 may be erroneously printed at 90%; and density classification 4 may be erroneously printed at 100%. In this manner, the various compensation schemes can compensate for differences in printing equipment, differences in printing quality by media lot, or differences in optical reading equipment.

Although each pixel 18 may be of nearly any desired size, in one embodiment the size of each pixel is about 100 microns by 100 microns, and each pixel 18 may include, for example, 100 dots (i.e. 10 dots by 10 dots) therein. Thus, the method and apparatus for recording data of the present invention enables large volumes of data to be accommodated and stored in a relatively small space.

The media card 10, and particularly the data storage region 16, can be formed by nearly any color printing process, such as screen printing, laser printing, ink jet printing, digital printing using photosensitive imaging media, photographic printing, "polaroid"-type printing, thermal-autochrome printing, disublimation and the like. However, it may be preferred to print the media card 10, and particularly the data storage region 16, using a self-contained photohardenable imaging media process, such as by using the self-contained photohardenable imaging media sold by Cycolor Inc. of Miamisburg, Ohio, which provides high resolution color printing with rich gradations and rich color expressions. Furthermore, although pixels or other components may be referred to herein as being "printed," or being "printed" at a specific of predetermined color or density, it should be understood that such pixels or other components need not necessarily be "printed" by a printer but could instead be formed by nearly any printing or image-forming process.

Figure 2:
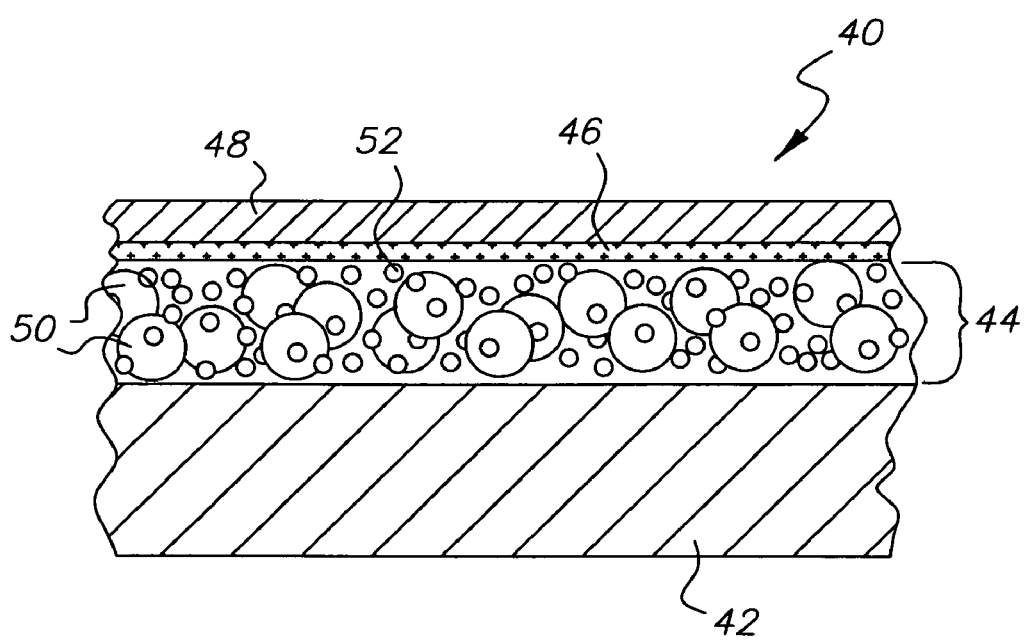
FIG. 2 is a cross section of a sheet which can be used to form the media card of FIG. 1.

In one embodiment, the media card 10, and particularly the data storage region 16, is created on a sheet of media 40 including microcapsules 50 encapsulated therein. As shown in FIG. 2, in this case the sheet of media 40 may include a support layer 42, a self-contained photosensitive and pressure sensitive layer 44 located on the support layer 42, a barrier layer 46 located over the photosensitive and pressure sensitive layer 44 and a protective layer 48 located over the barrier layer 46. The support layer 42 may be a variety of materials, such as PET (poly ethylene terephthalate (polyester)), polypropylene, synthesized paper, resin coated paper and the like.

The photosensitive and pressure sensitive layer 44 preferably includes a plurality of microcapsules 50 dispersed therein, with each microcapsule 50 including a liquid color former or color precursor encapsulated therein. The contents of each of the microcapsules 50 are preferably light sensitive and the color former inside each microcapsule 50 preferably corresponds to one of three primary colors. The photosensitive and pressure sensitive layer 44 may also include a developer material or resin 52 suspended therein which can react and make colors with a color former. The barrier layer 46 may be any of a wide variety of materials, including but not limited to water soluble resins such as PVA (polyvinyl alcohol) or gelatin. However, the barrier layer 46 is optional and need not be included. The protective layer 48 may provide a water resistant and scratch resistant surface to the imaging media, and may be a wide variety of materials, including but not limited to water soluble resins such as PVA (polyvinyl alcohol), gelatin or water dispersible resins such as acrylic latex or other polymer lattices. The photosensitive and pressure sensitive layer 44 is preferably applied to the support 42 by any of a variety of coating methods such as blade coating, air coating, curtain coating and the like.

Figure 8:
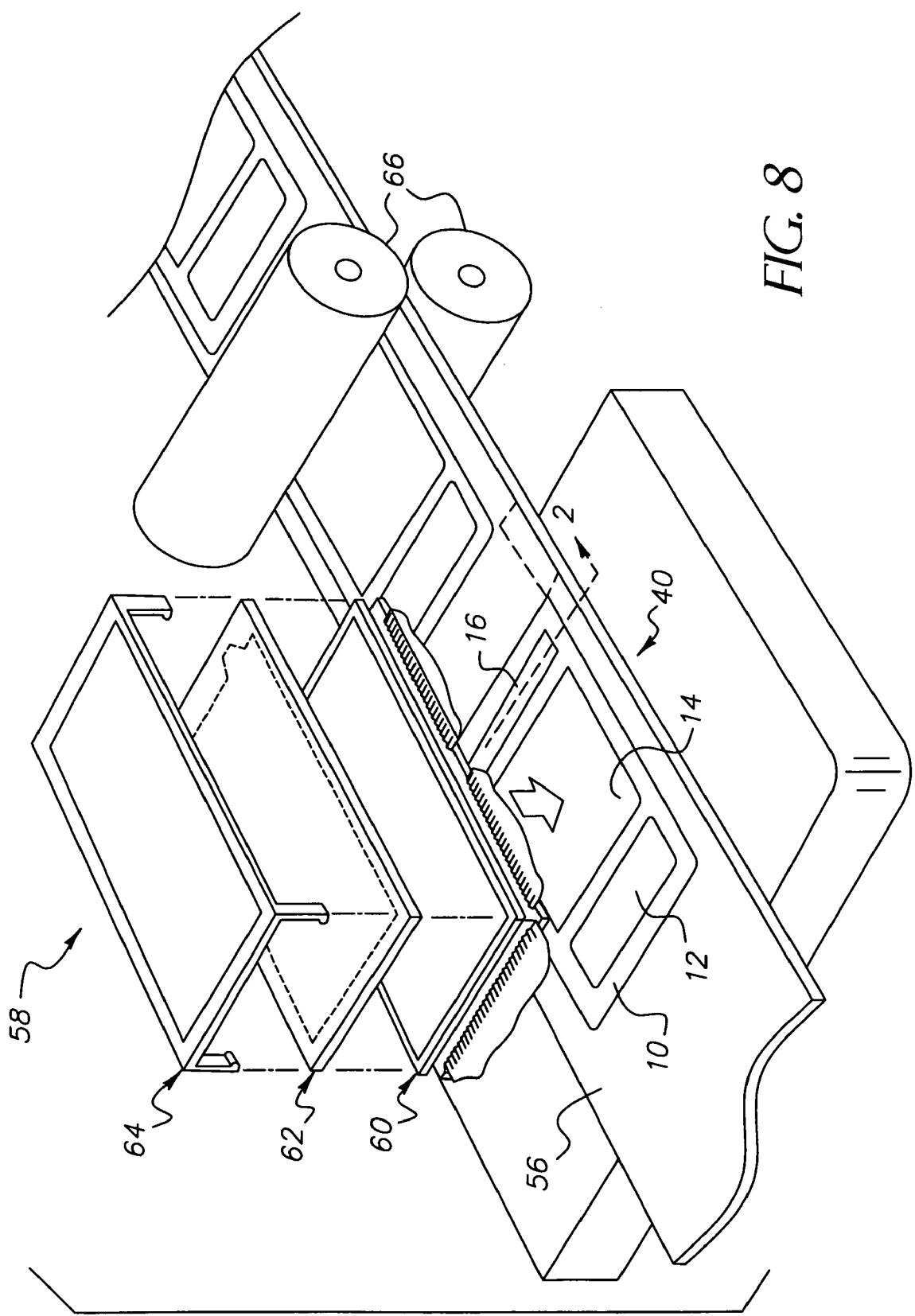
FIG. 8 is a partially exploded schematic view illustrating one method for forming the media card of FIG. 1.

As shown in FIG. 8, the sheet of media 40 of FIG. 2 may be placed on a support sheet 56 such that the sheet 40 is located below a recording head, generally designated 58. The recording head 58 may include a liquid crystal display panel 60, a back light 62 which can emit light of various colors, and a support panel 64 located above the back light 62. The liquid crystal display panel 60 can be controlled to form areas of light and dark located thereon in a desired pattern such that the light of various colors emitted from the back light 62 can be transmitted and blocked in the desired manner such that a liquid crystal display panel 60 operates as a mask. In this manner, selected microcapsules 50 inside the photosensitive and pressure sensitive layer 44 can be exposed to actinic radiation to harden the liquid color former in selected microcapsules 50 in the desired manner and pattern. The liquid color former in the remaining, unexposed microcapsules 50 remains in its liquid form. In other words, the media sheet 40 is image-wise exposed to actinic radiation to form a latent image in the form of hardened, partially hardened and unhardened microcapsules 50.

Once the specific colors of the microcapsules 50 have been hardened in the desired patterns, the media card 40 and support sheet 56 are conveyed downstream through the nip of a pair of opposed pressure rollers 66 which break the unhardened capsules 50. The color former released from the ruptured microcapsules 50 reacts with the developer resin located in the photosensitive and pressure sensitive layer 44 to cause the desired pattern of colors to form in the media card 10. Such a printing system is described and shown in U.S. Pat. Nos. 4,399,209; 4,416,966; 4,440,846; 4,766,050 and 5,783,353, the contents of which are hereby incorporated by reference. Once the data storage region 16 is formed on the media in the desired manner, the card can be stored or transported and used as a media storage device in the manner described above.

Having described the invention in detail and by reference to the preferred embodiments, it will be apparent that modifications and variations thereof are possible without departing from the scope of the invention.

What is claimed is:

1. A method for storing data comprising the steps of:
providing a sheet of media;
printing a raw data pixel on said sheet of media, said raw data pixel including at least one color printed at a specific density and a color such that said raw data pixel represents a data point:
printing an associated compensated data pixel on said sheet of media, said compensated data pixel including at least one color printed at a specific density, wherein said color and density of said compensated data pixel are related to the color and density of the associated raw data pixel by a predefined relationship;
repeating said first and second printing steps until the desired data is stored on said sheet of media; and
wherein each raw and compensated data pixel is printed at one of four discreet density levels, wherein a second density level has a higher density than a first density level, a third density level has a higher density than said second density level, and a fourth density level has a higher density than said third density level, and wherein when said raw data pixel is printed at said first density level, the associated compensated data pixel is printed at said third density level, and wherein when said raw data pixel is printed at said second density level, the associated compensated data pixel is printed at said fourth density level, and wherein when said raw data pixel is printed at said third density level, the associated compensated data pixel is printed at said first density level, and wherein when said raw data pixel is printed at said fourth density level, the associated compensated data pixel is printed at said second density level.

2. The method of claim 1 wherein said sheet of media includes a plurality of pixel locations, each raw and compensated data pixel being printed at one of said pixel locations, and wherein each raw and compensated data pixel includes at least two colors printed in an overlapping manner on a pixel location of said sheet of media.

3. The method of claim 2 wherein each color of each raw and compensated data pixel is printed at one of a predetermined, discreet density level, wherein said predetermined number of discreet density levels is from 2 to about 10.

4. The method of claim 2 wherein each raw and compensated data pixel includes at least three primary colors printed in an overlapping manner on a pixel location of said sheet of media.

5. The method of claim 1 further comprising the step of providing a set of raw data and converting said raw data into a plurality of raw data pixels, each raw data pixel including a density and color characteristic based upon a characteristic of the raw data.

6. The method of claim 1 wherein each compensated data pixel is printed at the same color as, and at a different density than, the associated raw data pixel.

7. The method of claim 1 wherein the density of each compensated data pixel is more than about 50% if the density of the associated raw data pixel is less than about 50%.

8. The method of claim 1 wherein each raw data pixel is printed adjacent to the associated compensated data pixel.

9. The method of claim 1 further comprising the step of printing a plurality of timing marks on said sheet of media at a predetermined color, density and location at regular locations on said sheet of media such that an optical tool scanning said printed sheet of media can track its location.

10. The method of claim 1 further comprising the step of printing a calibration section on said sheet of media, said calibration section including a plurality of pixels printed at a predetermined color and density such that an optical tool can scan said calibration section and adjust its readings of the raw and compensated data pixels printed on said sheet of media.

11. A media storage device comprising a sheet of media having a plurality of raw and compensated data pixels located thereon, each raw data pixel having at least one color at a specific density such that said raw data pixel represents a data point based upon said color and density characteristics, each compensated data pixel having at least one color at a specific density related to the color and density of an associated raw data pixel by a predefined relationship; and
wherein each raw and compensated data pixel has one of four discreet density levels, wherein a second density level has a higher density than a first density level, a third density level has a higher density than said second density level, and a fourth density level has a higher density than said third density level, and wherein when said raw data pixel has said first density level, the associated compensated data pixel has said third density level, and wherein when said raw data pixel has said second density level, the associated compensated data pixel has said fourth density level, and wherein when said raw data pixel has said third density level, the associated compensated data pixel has said first density level, and wherein when said raw data pixel has said fourth density level, the associated compensated data pixel has said second density level.

12. The media storage device of claim 11 wherein said sheet of media includes a plurality of pixel locations, each raw and compensated data pixel being located at one of said pixel locations, and wherein each raw and compensated data pixel includes at least two colors printed in an overlapping manner on a pixel location of said sheet of media.

13. The media storage device of claim 12 wherein each color of each raw and compensated data pixel is at one of a predetermined, discreet density levels, wherein said predetermined number of discreet density levels is from 2 to about 10.

14. The media storage device of claim 12 wherein each raw and compensated data pixel includes at least three primary colors located in an overlapping manner on an associated single pixel location of said sheet of media.

15. The media storage device of claim 11 wherein each compensated data pixel has the same color as, and a different density from, the associated raw data pixel.

16. The media storage device of claim 11 wherein the density of each compensated data pixel is more than about 50% if the density of the associated raw data pixel is less than about 50%.

17. The media storage device of claim 11 wherein each raw data pixel is located adjacent to its associated compensated data pixel.

18. The media storage device of claim 11 wherein each raw data pixel includes a single associated compensated data pixel, and each compensated data pixel includes a single associated raw data pixel.

19. The media storage device of claim 11 further comprising a plurality of timing marks printed thereon at a predetermined color, density and location at regular locations on said sheet of media such that an optical tool scanning said printed sheet of media can track its location.

20. The media storage device of claim 11 further comprising a calibration section located thereon, said calibration section including a plurality of pixels printed at a predetermined color and density such that an optical tool can scan said calibration section and adjust its readings of the raw and compensated data pixels printed on said sheet of media.

* * * * *